United States Patent
Lee et al.

(10) Patent No.: US 11,126,300 B2
(45) Date of Patent: Sep. 21, 2021

(54) ELECTRONIC DEVICE AND INPUT PROCESSING METHOD THEREOF

(71) Applicant: Samsung Electronics Co., Ltd., Suwon-si (KR)

(72) Inventors: Kiseok Lee, Yongin-si (KR); Kyungwhoon Cheun, Seoul (KR); Dohy Hong, Seoul (KR); Sungkee Kim, Hwaseong-si (KR); Sungil Park, Suwon-si (KR); Changmin Ha, Ulsan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 15/598,576

(22) Filed: May 18, 2017

(65) Prior Publication Data

US 2017/0336916 A1 Nov. 23, 2017

(30) Foreign Application Priority Data

May 18, 2016 (KR) .......................... 10-2016-0060678

(51) Int. Cl.
*G06F 3/041* (2006.01)
*G06F 3/0484* (2013.01)
*G06F 3/0488* (2013.01)

(52) U.S. Cl.
CPC .......... *G06F 3/0418* (2013.01); *G06F 3/0488* (2013.01); *G06F 3/04842* (2013.01)

(58) Field of Classification Search
CPC ... G06F 3/0418; G06F 3/04842; G06F 3/0488
See application file for complete search history.

(56) References Cited

U.S. PATENT DOCUMENTS

| | | | |
|---|---|---|---|
| 9,235,281 B2 | 1/2016 | Zhou et al. | |
| 2004/0204129 A1 | 10/2004 | Payne et al. | |
| 2006/0197753 A1 | 9/2006 | Hotelling | |
| 2010/0127997 A1* | 5/2010 | Park ...................... | G06F 3/0416 345/173 |
| 2010/0283758 A1 | 11/2010 | Homma et al. | |
| 2011/0012856 A1 | 1/2011 | Maxwell et al. | |
| 2011/0096025 A1 | 4/2011 | Slobodin et al. | |

(Continued)

FOREIGN PATENT DOCUMENTS

| | | |
|---|---|---|
| KR | 10-2016-0046401 A | 4/2016 |
| WO | 2004/031930 A1 | 4/2004 |

OTHER PUBLICATIONS

International Search Report dated Aug. 11, 2017, issued in the International Application No. PCT/KR2017/004935.

(Continued)

*Primary Examiner* — Patrick N Edouard
*Assistant Examiner* — Eboni N Giles
(74) *Attorney, Agent, or Firm* — Jefferson IP Law, LLP

(57) ABSTRACT

A method of processing an input in an electronic device having a touch screen is provided. The method includes identifying attribute information of a geometric figure corresponding to an area of a touch input detected through the touch screen, determining a user input from the attribute information, based on a stored user input distinction rule, and executing a function corresponding to the determined user input.

19 Claims, 10 Drawing Sheets

(56) References Cited

U.S. PATENT DOCUMENTS

| | | | |
|---|---|---|---|
| 2012/0313865 A1* | 12/2012 | Pearce | G06F 3/0416 345/173 |
| 2013/0106776 A1* | 5/2013 | Park | G06F 3/04883 345/174 |
| 2013/0109369 A1* | 5/2013 | Forutanpour | A61B 5/1072 455/418 |
| 2014/0002407 A1* | 1/2014 | Badaye | G06F 3/0416 345/174 |
| 2015/0049064 A1* | 2/2015 | Shin | G06F 3/044 345/178 |
| 2015/0091841 A1 | 4/2015 | Lewis et al. | |
| 2015/0153893 A1* | 6/2015 | Park | G06F 3/0488 345/173 |
| 2015/0185958 A1* | 7/2015 | Park | G06F 3/0416 345/175 |
| 2016/0110013 A1 | 4/2016 | Yu | |
| 2017/0083230 A1* | 3/2017 | Reddy | G06F 3/04886 |
| 2017/0249048 A1* | 8/2017 | Hill | G06F 1/1694 |
| 2018/0046319 A1* | 2/2018 | Luo | G06F 3/0418 |
| 2019/0095036 A1* | 3/2019 | Bokma | G06F 1/163 |

OTHER PUBLICATIONS

Extended European Search Report dated Mar. 13, 2019, issued in European Application No. 17799596.6.
European Office Action dated Jun. 16, 2020, issued in European Patent Application No. 17 799 596.6.

* cited by examiner

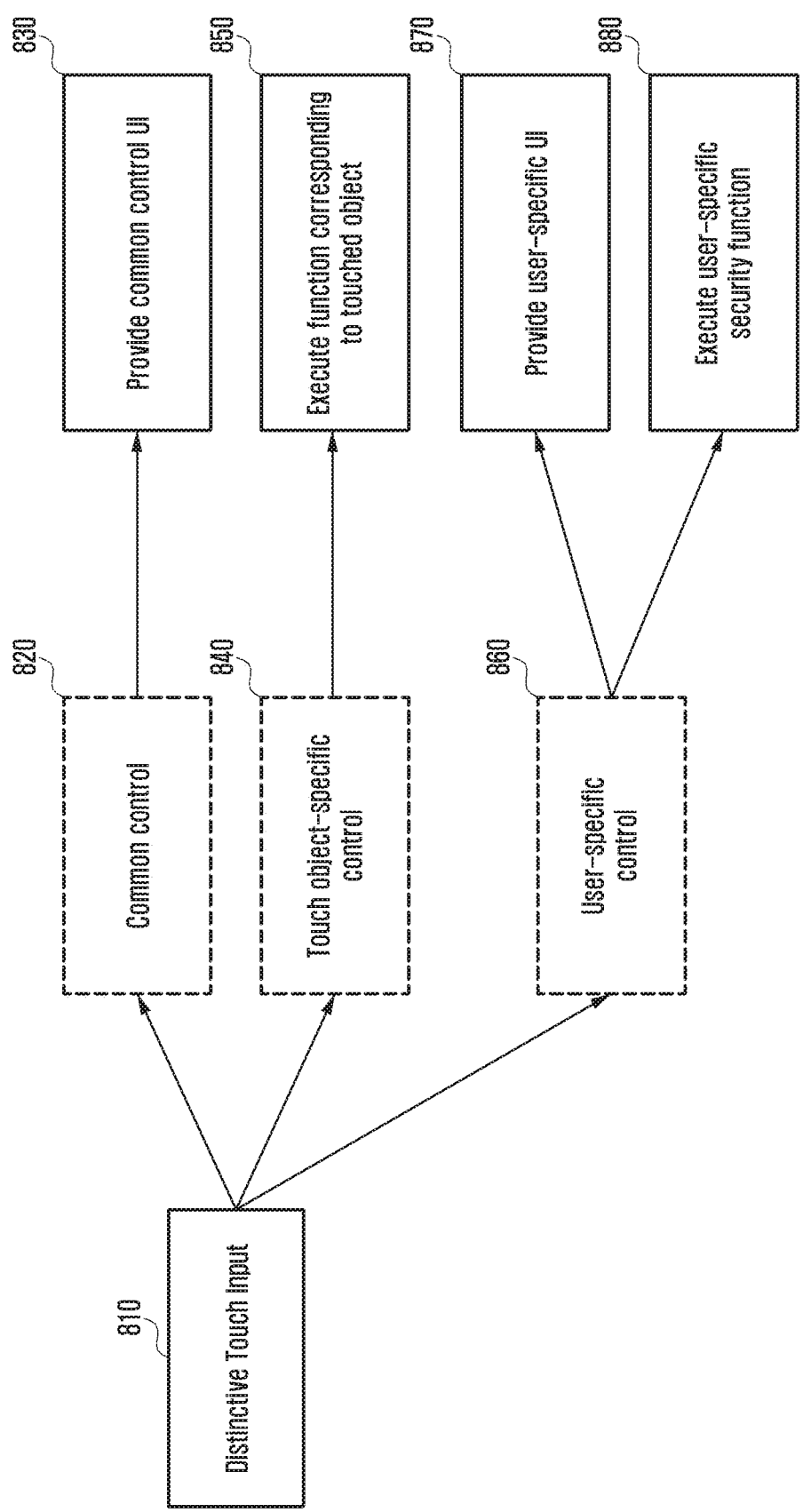

ELECTRONIC DEVICE AND INPUT PROCESSING METHOD THEREOF

CROSS-REFERENCE TO RELATED APPLICATION(S)

This application claims the benefit under 35 U.S.C. § 119(a) of a Korean patent application filed on May 18, 2016 in the Korean Intellectual Property Office and assigned Serial number 10-2016-0060678, the entire disclosure of which is hereby incorporated by reference.

TECHNICAL FIELD

The present disclosure relates to an electronic device and an input processing method thereof. More particularly, the present disclosure relates to a method for processing an input in an electronic device having a touch screen.

BACKGROUND

Today, various electronic devices as well as portable devices including smart phones, tablet personal computers (PCs), and the like have a touch panel to intuitively process a user's input. Normally, the touch panel may be combined with a display panel to form one module and provide a touch screen to a user.

Meanwhile, with the development of technologies, electronic devices are becoming increasingly sophisticated and complicated. Thus, in order to efficiently and intuitively perform a variety of functions provided by the electronic device, an interaction between the electronic device and the user becomes more and more important.

The above information is presented as background information only to assist with an understanding of the present disclosure. No determination has been made, and no assertion is made, as to whether any of the above might be applicable as prior art with regard to the present disclosure.

SUMMARY

Generally, when a certain touch input is received through a touch screen, this input is processed on the basis of typical touch-related information such as a touch location (e.g., coordinates), a touch time, and a touch count.

Aspects of the present disclosure are to address at least the above-mentioned problems and/or disadvantages and to provide at least the advantages described below. Accordingly, an aspect of the present disclosure is to provide a technique for processing a touch input, based on various kinds of information as well as typical touch-related information, and for executing a particular function corresponding to the touch input.

In accordance with an aspect of the present disclosure, a method of processing an input in an electronic device having a touch screen is provided. The method includes identifying attribute information of a geometric figure corresponding to an area of a touch input detected through the touch screen, determining a user input from the attribute information, based on a stored user input distinction rule, and executing a function corresponding to the determined user input.

In accordance with another aspect of the present disclosure, an electronic device is provided. The electronic device includes a touch screen configured to detect a touch input, a memory configured to store a user input distinction rule, and at least one processor configured to: identify attribute information of a geometric figure corresponding to an area of the touch input detected through the touch screen, determine a user input from the attribute information, based on the stored user input distinction rule, and execute a function corresponding to the determined user input.

According to the present disclosure, it is possible to generate various commands from the touch input by using the existing touch screen through software improvement without installing additional hardware. Thus, the interaction through the touch screen between the user and the electronic device can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram illustrating an example of executing various functions in response to a distinctive touch input of an electronic device according to an embodiment of the present disclosure.

Throughout the drawings, like reference numerals will be understood to refer to like parts, components, and structures.

DETAILED DESCRIPTION

Figure 1:
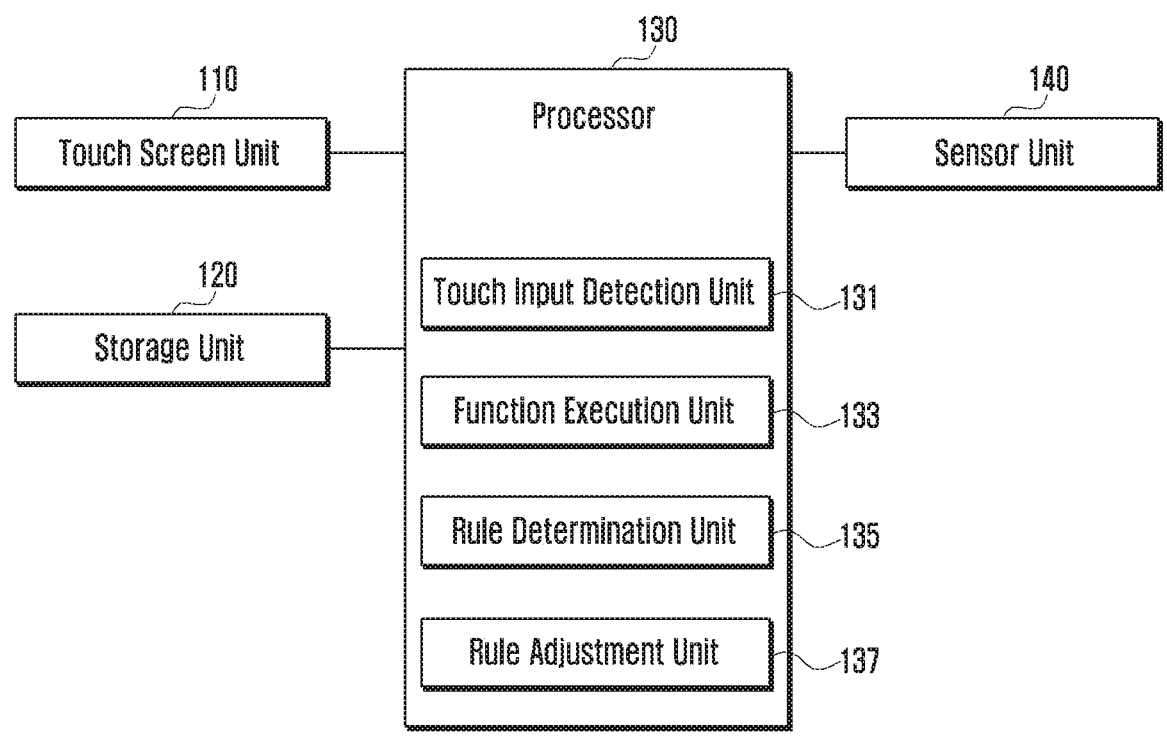
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in various embodiments of the present disclosure denote the presence of the disclosed functions, operations, and elements and do not limit one or more additional functions, operations, and elements. Additionally, in various embodiments of this disclosure, the terms such as "comprise", "include", and/or "have" may be construed to denote a certain characteristic, number, operation, element, component or a combination thereof, but may not be construed to exclude the existence of or a possibility of addition of one or more other characteristics, numbers, operations, elements, components or combinations thereof.

Furthermore, in various embodiments of the present disclosure, the expression "or" includes any and all combinations of the associated listed words. For example, the expression "A or B" may include A only, may include B only, or may include both A and B.

In various embodiments of the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them the first user device and the second user device are user devices. For example, a first element could be termed a second element, and similarly, a second element could be also termed a first element without departing from the scope of the present disclosure.

In the case where according to which a component is referred to as being "connected" or "accessed" to another component, it should be understood that not only the component is directly connected or accessed to the other component, but also there may exist another component between them the component and the other component. Meanwhile, in the case where according to which a component is referred to as being "directly connected" or "directly accessed" to another component, it should be understood that there is no component therebetween.

An electronic device according to the present disclosure may be a device that involves a display function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an moving picture experts group (MPEG-1 or MPEG-2) audio layer-3 (MP3) player, a portable medical device, a digital camera, or a wearable device (e.g., an head-mounted device (HMD) such as electronic glasses, electronic clothes, an electronic bracelet, an electronic necklace, an electronic appcessory, or a smart watch).

According to some embodiments, an electronic device may be a smart home appliance that involves a display function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., magnetic resonance angiography (NBA), magnetic resonance imaging (MRI), computed tomography (CT), ultrasonography, etc.), a navigation device, a global positioning system (GPS) receiver, an event data recorder (EDR), an flight data recorder (MR), a car infotainment device, electronic equipment for ship (e.g., a marine navigation system, a gyrocompass, etc.), avionics, security equipment, an industrial or home robot, an automatic teller's machine (ATM), or a point of sales (POS).

According to some embodiments, an electronic device may be furniture or part of a building or construction having a display function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. Also, an electronic device disclosed herein may be a flexible device. As well understood by those skilled in the art, an electronic device disclosed herein is not to be considered as a limitation of the present disclosure.

Hereinafter, an electronic device according to various embodiments will be described with reference to the accompanying drawings. The term user, used in the present disclosure, may refer to a person or a device (e.g., an artificial intelligence device) using an electronic device.

FIG. 1 is a block diagram illustrating an electronic device 100 according to an embodiment of the present disclosure.

Referring to FIG. 1, the electronic device 100 may include at least one of a touch screen unit 110, a storage unit 120, a processor 130, and a sensor unit 140. In addition, although not shown, the electronic device 100 may further include at least one of a key input unit, a wireless communication unit, a microphone, and a voice output unit.

The touch screen unit 110 may include a touch panel and a display panel.

The touch panel may be a complex touch panel that includes a finger touch panel for sensing a touch input by a finger and a pen touch panel for sensing a touch input by a pen. The finger touch panel may be implemented as a capacitive type. Of course, the finger touch panel may be implemented as any other type such as a resistive type, an infrared type, or an ultrasonic type. In addition, the finger touch panel does not generate an event only by a user's finger, but can also generate an event by another tool (e.g., a conductive object capable of causing a change in capacitance to the finger touch panel). The pen touch panel may be configured as an electromagnetic induction type. Therefore, the pen touch panel may generate an event by using a touch pen specially designed to form a magnetic field.

If a touch input tool (e.g., a touch pen tip or a fingertip) provides a physical touch input, the touch panel may detect at least one of the location of the touch input and the area of the touch input. Normally, such a touch input may be provided to select or execute a graphical object displayed at a touch location. By the way, an actual touch corresponds to a certain region having an area rather than a certain point.

Therefore, in various embodiments of the present disclosure, the touch panel may recognize a touch input as a geometric figure (e.g., an ellipse) having a certain area.

Figure 2:
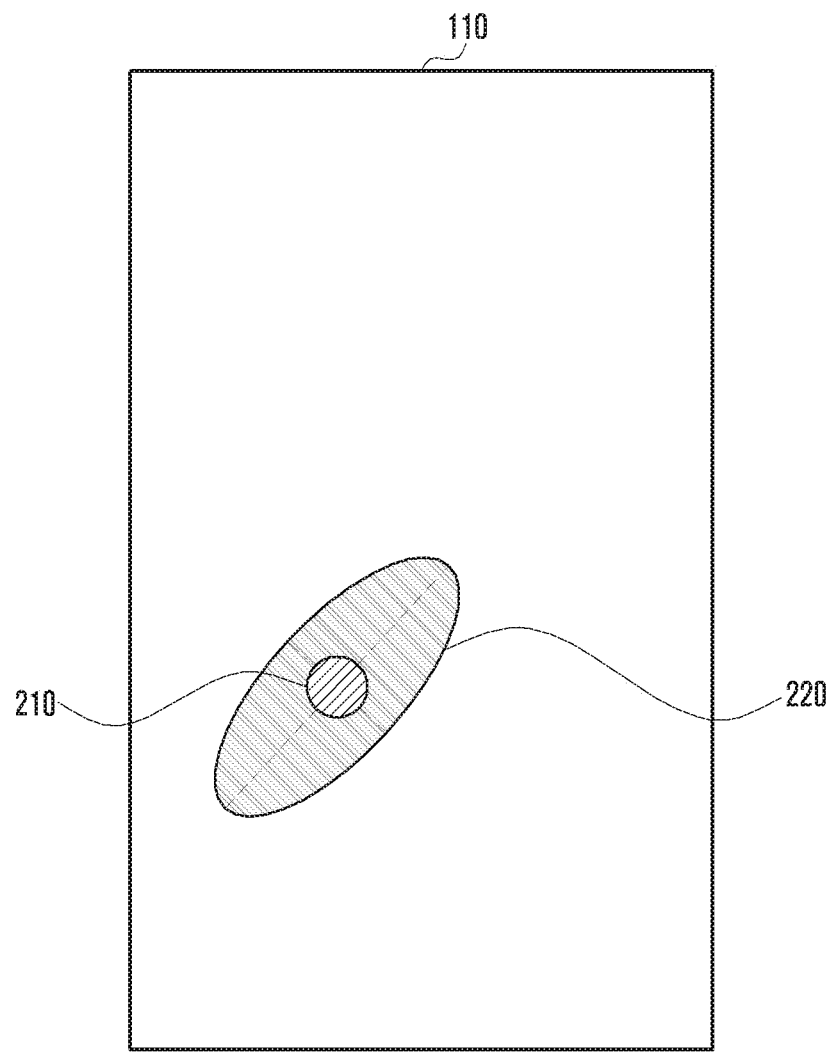
FIG. 2 is a diagram illustrating the distinction of touch inputs according to an embodiment of the present disclosure.

FIG. 2 is a diagram illustrating the distinction of touch inputs according to an embodiment of the present disclosure.

Referring to FIG. 2, the touch panel of the touch screen unit 110 may provide, as location information, the coordinates of a predetermined point 210 (e.g., a center point) in a geometric figure 220 corresponding to the area of a touch input, and may also provide additional information associated with attributes of the geometric figure 220. This additional information may include, for example, at least one of a length (e.g., a major-axis length and/or a minor-axis length), an area, the number of pixels, a shape, a direction, and a slope (e.g., a slope of a major axis) in connection with all or part of the geometric figure or a secondary figure derived from the geometric figure.

As will be discussed in detail below, based on the location information and the additional information in connection with the geometric figure, the touch input may be determined as one of at least two different inputs according to a stored user input distinction rule.

Figure 3A:
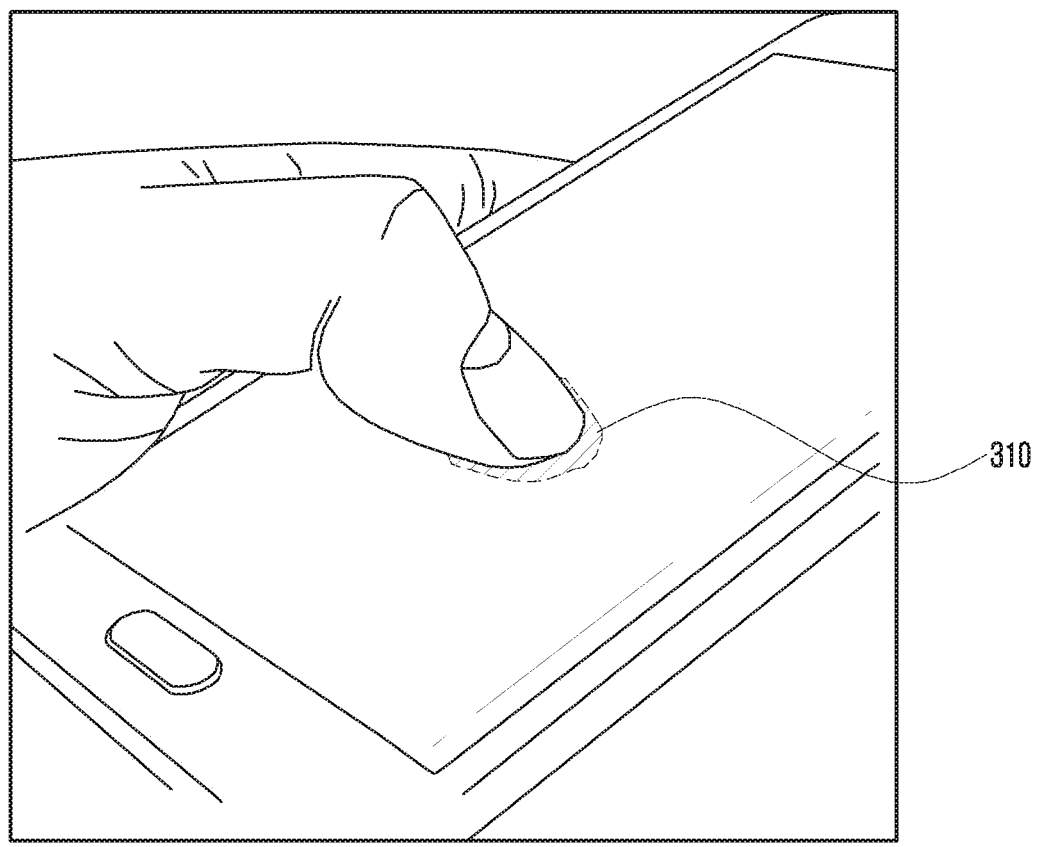
FIG. 3A is a diagram illustrating a normal touch input according to an embodiment of the present disclosure.

FIG. 3A is a diagram illustrating a normal touch input according to an embodiment of the present disclosure.

Figure 3B:
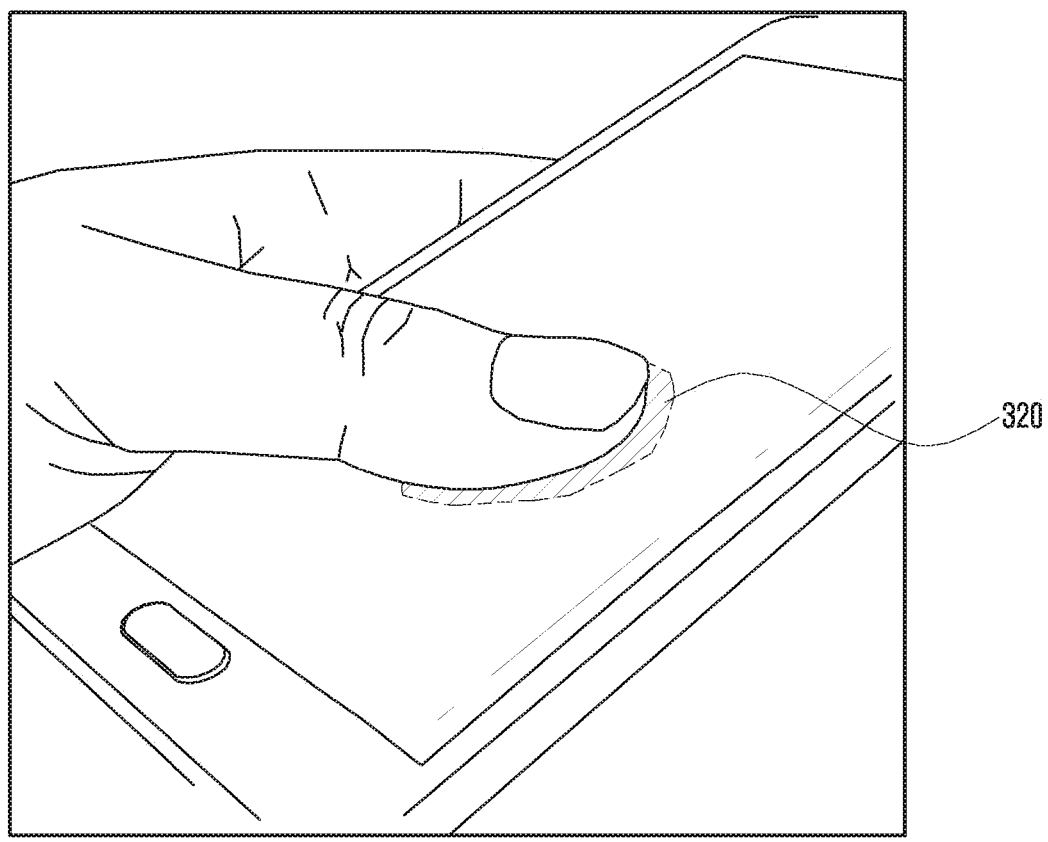
FIG. 3B is a diagram illustrating a distinctive touch input according to an embodiment of the present disclosure.

FIG. 3B is a diagram illustrating a distinctive touch input according to an embodiment of the present disclosure.

Referring to FIGS. 3A and 3B, in this disclosure, touch inputs are classified into a normal touch input 310 (e.g., a narrow input) and a distinctive touch input 320 (e.g., a wide input). This is, however, not to be construed as a limitation of the present disclosure. As will be understood by those skilled in the art, touch inputs may be variously classified into many inputs and widely applied to techniques for performing functions, based on location information and additional information in connection with geometric figures of the touch inputs.

Meanwhile, the touch panel may detect the proximity of a touch input tool when the touch input tool approaches within a predetermined distance, e.g., within 10 cm, from the touch screen.

The storage unit 120 may store instructions or data received or created from the processor 130 or any other element. In addition, the storage unit 120 may store software executed by the processor 130.

The storage unit 120 may also store a user input distinction rule for touch input distinction. In order to determine the user input distinction rule, touch inputs provided by a user at a usual time may be collected and stored in the storage unit 120. Alternatively or additionally, the storage unit 120 may store patterns of such collected touch inputs.

The user input distinction rule may be a value based on at least one of a maximum, a minimum, an average, a deviation and a distribution value for at least one of a length (e.g., a major-axis length and/or a minor-axis length), an area, the number of pixels, a shape, a direction, and a slope (e.g., a slope of a major axis) in connection with all or part of the geometric figure or a secondary figure derived from the geometric figure. The user input distinction rule may include, for example, a first threshold value associated with a normal touch input and a second threshold value associated with a distinctive touch input. Touch inputs may be distinguished in comparison with the first and second threshold values.

Additionally, the user input distinction rule may be a value correlated with a location of the touch input. The user input distinction rule may be defined such that a weight is assigned to a specific input among touch inputs. For example, a weight may be assigned to the distinction as a normal touch input.

The user input distinction rule stored in the storage unit 120 may be updated and adjusted depending on a user's use.

The processor 130 may execute a particular function corresponding to a touch input recognized through the touch panel.

For example, referring to FIG. 1, the processor 130 may include at least one of a touch input detection unit 131, a function execution unit 133, a rule determination unit 135, and a rule adjustment unit 137. This is, however, not to be construed as a limitation of elements required for the operation of the processor 130.

The touch input detection unit 131 may identify attribute information of a geometric figure corresponding to a touch input detected through the touch panel. In addition, the touch input detection unit 131 may determine a user input from the attribute information, based on a user input distinction rule. The attribute information of the geometric figure may include at least one of a maximum, a minimum, an average, a deviation and a distribution value for at least one of a length (e.g., a major-axis length and/or a minor-axis length), an area, the number of pixels, a shape, a direction, and a slope (e.g., a slope of a major axis) in connection with all or part of the geometric figure or a secondary figure derived from the geometric figure. The user input may be determined as a normal touch input or a distinctive touch input.

Meanwhile, the touch input detection unit 131 may detect an error occurrence or a probability thereof in the user input determination. For example, when an attribute information value of the geometric figure in connection with a touch input belongs to an ambiguous region that is not distinguished by the user input distinction rule, it may be detected as an error occurrence, or it may be detected that the error occurrence probability is high.

If the attribute information value belongs to the ambiguous region, the touch input detection unit 131 may perform additional input distinction procedure. Namely, the touch input detection unit 131 may reserve the touch input distinction or notify this to the user through a visual, auditory or tactile signal so as to confirm again a user's intention. Alternatively, the touch input detection unit 131 may provide an option to distinguish an input to the sensor unit 140 so as to clarify the input.

For example, the touch input detection unit 131 may perform at least one of the following operations for determining a clear user input. For example, the touch input detection unit 131 may determine a user input, based on the degree of proximity to the user input distinction rule. Also, the touch input detection unit 131 may determine a user input, based on a predetermined priority for the user input. Also, the touch input detection unit 131 may provide a menu for distinguishing a user input (e.g., through the touch screen unit 110), and may determine the user input by detecting a selection input for the menu. Also, the touch input detection unit 131 may provide a touch input guide (e.g., through the touch screen unit 110) for the user input distinction. For example, it is possible to provide a guide phrase such as "please touch softly for the execution of the first function" or "please touch widely for the execution of the second function" through the screen. The touch input detection unit 131 may detect an additional input distinction operation through at least one of the touch panel, the microphone, and the sensor unit 140 to determine a user input. Alternatively or additionally, the touch input detection unit 131 may output a screen for learning the user input distinction.

The function execution unit 133 may execute a particular function which corresponds to the user input determined by the touch input detection unit 131.

For example, the function execution unit 133 may provide a user interface (UI) corresponding to the determined user input. For example, the function execution unit 133 may execute a function corresponding to a normal touch input when the user input is determined as the normal touch input, and may provide a common control UI when the user input is determined as a distinctive touch input. The common control UI may include, for example, a UI for a common function control regardless of a currently executed function, page, application (APP), or a selected object. For example, depending on an associated operation, the function execution unit 133 may invoke a pointer so as to select and execute an object in a non-reachable region or may define a frequently used function as a shortcut key.

In addition, the function execution unit 133 may execute a particular function corresponding to an object related to the touch input, based on the determined user input. For example, when the normal touch input for an image object is received, the function execution unit 133 may enlarge a corresponding image and provide the enlarged image through a screen. When the distinctive touch input is received, the function execution unit 133 may provide additional information about the image object through a window. In case of an app icon object, a normal touch input may be used for performing an app trigger, but a distinctive touch input may be used as an input for changing an app's settings. Such an additional input applied to the object may be changed as needed.

In addition, the function execution unit 133 may collect and store information about a touch input pattern of each user in the storage unit 120, and may perform a user-specific control based on the stored information. The function execution unit 133 may create statistics of various kinds of information, obtained through a user's touch input, such as maximum and minimum values, an average value, a deviation value, and calculation results thereof with regard to major and minor axes of a geometric figure corresponding to the area of each of a normal touch input and a distinctive touch input. Such statistical information indicates the number of users of the device and the characteristics of users. Therefore, based on the statistical information, it is possible to provide different UIs for respective users or provide user-customized services e.g., recommendation for changing the size of an app icon). Also, when any input of unusual pattern is detected, the statistical information may be used as a means of security enhancement to require additional authentication.

For example, the function execution unit 133 may provide a common function to the users in case of a normal touch input, and may provide user-customized UIs to the users in case of a distinctive touch input. The user-customized UI may be determined by considering the frequency of use of an APP by each user, or may be determined by user-specific setting. Also, the function execution unit 133 may provide a common function to the users in case of a normal touch input, and may execute a security function for each user upon successful authentication by requesting user-specific authentication in case of a distinctive touch input.

The rule determination unit 135 may determine the user input distinction rule for distinguishing touch inputs from each other.

For example, the rule determination unit 135 may collect touch inputs provided by the user at a usual time and estimate the user input distinction rule from a pattern of the collected touch inputs. Namely, from a usual user's touch input, the rule determination unit 135 may collect attribute information of a geometric figure corresponding to the area of a touch input determined as a normal touch input and determine the user input distinction rule on the basis of the collected information. Then the rule determination unit 135 may store the determined user input distinction rule in the storage unit 120.

In addition, the rule determination unit 135 may enter a mode for learning the user input distinction in response to a user command and then determine the user input distinction rule. In the learning mode, the rule determination unit 135 may collect the attribute information of a geometric figure corresponding to the area of a touch input determined as a normal touch input, and also collect the attribute information of a geometric figure corresponding to the area of a touch input determined as a distinctive touch input. Additionally, the rule determination unit 135 may determine the user input distinction rule, based on the collected information, and then store the determined user input distinction rule in the storage unit 120.

The following is an example in which the rule determination unit 135 collects and analyzes a pattern of touch inputs and then determines the user input distinction rule.

When the user provides a touch input to the touch screen unit 110, the touch panel may recognize a touch area as a two-dimensional figure 220 as shown in FIG. 2. Factors for identifying the attributes of such a geometric figure may include at least one of a length, an area, the number of pixels, a shape, a direction, and a slope of the entire or part of the geometric figure or a secondary figure derived from the geometric figure. The rule determination unit 135 may determine the user input distinction rule by using a value having the lowest distinction error among such factors. Also, the rule determination unit 135 may determine the user input distinction rule by weighting a specific touch input among touch inputs.

The attribute information of a geometric figure corresponding to the area of a touch input provided to the touch panel may have different values depending on a hardware type and may vary depending on a user's finger size and touch habit. Also, the value may be different depending on a touch position even when the same user touches. Therefore, the rule determination unit 135 may divide the touch screen into predetermined regions and apply the user input distinction rule differently to the divided regions. For example, the rule determination unit 135 may derive a difference of a figure attribute corresponding to the area of a touch input for each of the divided regions and may determine the user input distinction rule for each divided region by using the attribute information having the lowest distinction error.

Meanwhile, since the area of a touch input detected through the touch panel is a variable value in time, it is also necessary to decide a time-related rule for determining the area of the touch input. Therefore, for improving reliability, the rule determination unit 135 may collect the figure attribute information for a given time and then determine the input distinction according to the rule. Alternatively, for a rapid response time, the rule determination unit 135 may determine the input distinction as soon as a value of maximum, minimum, average, deviation, variation, or distribution of all or some attributes of a geometric figure or a derived secondary figure satisfies the rule example, the rule determination unit 135 may define the decision timing of a touch input as a case when the average of attribute information of the figure satisfies the user input distinction rule value or when the attribute information of the figure exceeds the user input distinction rule value. In addition, the rule determination unit 135 may define the decision timing for a touch input by means of various rules.

Referring to FIG. 2, for example using information about a major axis (or referred to as touch major) and a minor axis (or referred to as touch minor) of a touch detected figure, the rule determination unit 135 may determine the user input distinction rule that classifies touch inputs into a narrow touch (e.g., a normal touch input) and a wide touch (e.g., a distinctive touch input). In addition to the influence of a finger size and a touch habit, the touch area may widen in case of a distant touch and become narrower in case of a close touch. Namely, when a distant portion is touched, a length deviation of major and minor axes is small and it is thus difficult to distinguish a narrow touch from a wide touch. Therefore, the rule determination unit 135 may collect, for example, touch inputs on the central region of the screen and include this collection in the analysis. Also, the rule determination unit 135 may calculate maximum/minimum values, an average value, a deviation, a distribution, and a touch duration of the collected major/minor axis length and then establish the rule for a wide touch and a narrow touch. In this case, the rule may be established in consideration of the correlation between a touch input area pattern provided by the user at a usual time and a touch input area pattern of the wide/narrow touch.

For example, the threshold of the user input distinction rule may be calculated as follows.

$$Threshold = (1.5*MAX - 0.5*AVG)*0.8 + 7$$

(MAX: the maximum value of major axis length in collected information, AVG: the average value of major axis length in collected information)

According to the above example, the touch input detection unit 131 may classify touch inputs into a wide touch and a narrow touch, depending on whether the major axis length is equal to or greater than the threshold.

On the other hand, the rule determination unit 135 may increase the recognition rate of the touch input distinction by determining the threshold relying on the touch position (coordinate).

As another example, the threshold of the user input distinction rule may be calculated as follows.

$$Threshold = MAX + 17 - 20*SQRT(Touch\_Duration)$$

Namely, the rule determination unit 135 may determine the threshold by further utilizing information about a touch duration.

The rule adjustment unit 137 may adjust the determined user input distinction rule. When the touch input detection unit 131 distinguishes a touch input in view of the attribute information of a geometric figure corresponding to the area of the touch input, the decision based on the determined user input distinction rule threshold may be ambiguous. Therefore, even when the rule determination unit 135 determines the user input distinction rule threshold, it may be necessary to update the determined user input distinction rule threshold in accordance with a continuous usage pattern. For example, when the touch input detection unit 131 detects that an error occurrence or a probability thereof in the touch input distinction exceeds a predetermined value, the rule adjustment unit 137 may adjust the determined user input distinction rule to reduce the error or probability thereof. For example, when touches are frequently performed in regions close to the user input distinction rule threshold, the user input distinction rule threshold may be increased or decreased.

Figure 4:
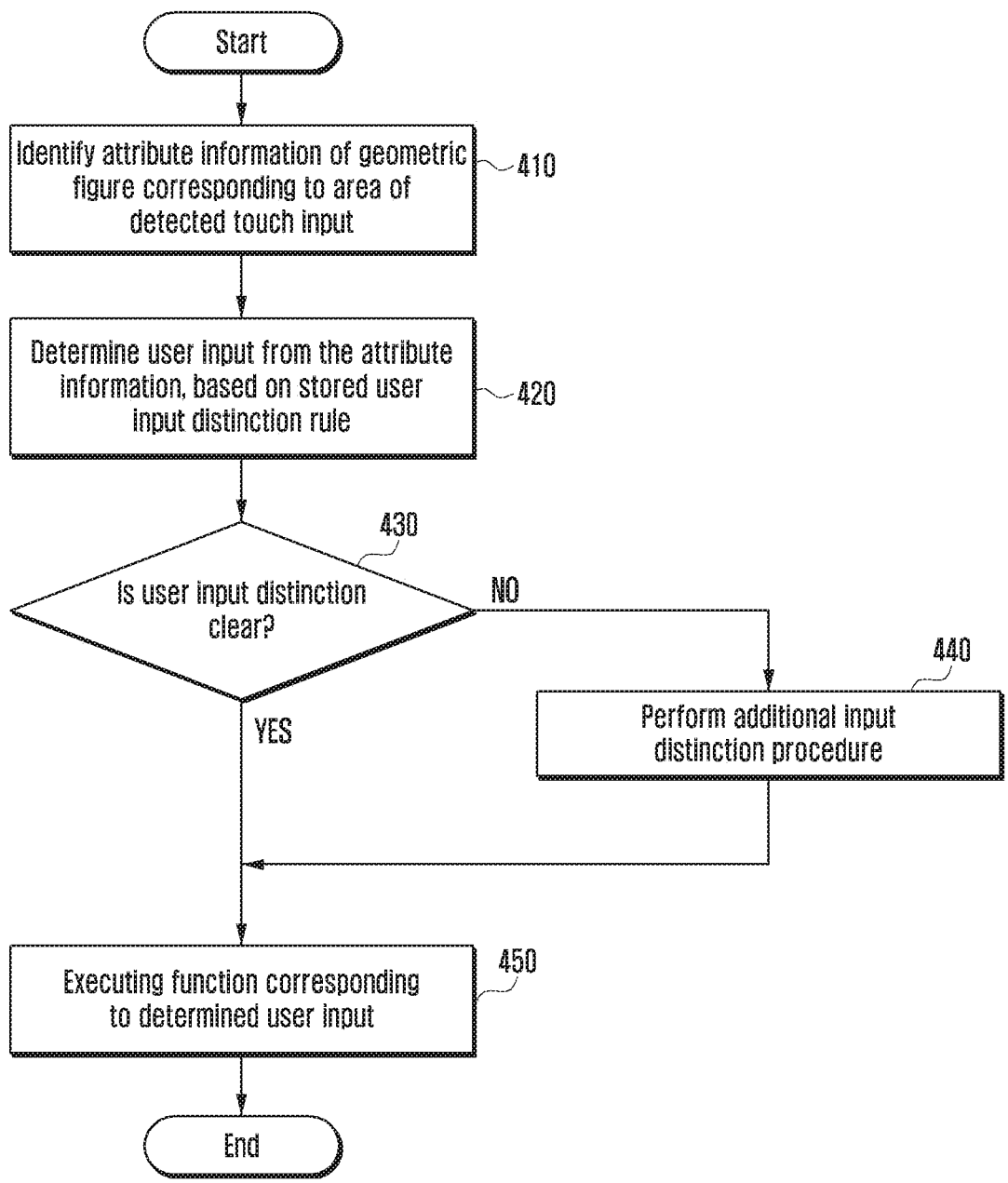
FIG. 4 is a flow diagram illustrating an input processing method of an electronic device according to an embodiment of the present disclosure.

FIG. 4 is a flow diagram illustrating an input processing method of an electronic device according to an embodiment of the present disclosure. For example, the input processing method shown in FIG. 4 may be performed by the processor 130 of FIG. 1.

At operation 410, the processor may identify attribute information of a geometric figure corresponding to the area of a touch input detected through the touch panel.

At operation 420, the processor may determine a user input from the attribute information, based on a stored user input distinction rule. The attribute information of the figure may include at least one of a maximum, a minimum, an average, a deviation and a distribution value for at least one of a length (e.g., a major-axis length and/or a minor-axis length), an area, the number of pixels, a shape, a direction, and a slope (e.g., a slope of a major axis) in connection with all or part of the geometric figure or a secondary figure derived from the geometric figure.

At operation 430, the processor may determine whether the user input distinction of the operation 420 is clear.

If the distinction is not clear, the processor may perform an additional input distinction procedures at operation 440. For example, the processor may determine the user input, based on the degree of proximity to the user input distinction rule. Also, the processor may determine the user input, based on a predetermined priority for the user input. Also, the processor may provide a menu for distinguishing the user input and determine the user input by detecting a selection input for the menu. Also, the processor may provide a touch input guide for the user input distinction. Also, the processor may determine the user input by detecting an additional input distinction operation through at least one of the touch panel, the microphone, and the sensor unit. Also, the processor may output a screen for learning the user input distinction.

Once the user input is determined, the processor may execute at operation 450 a particular function corresponding to the determined user input. For example, the processor may perform the first function in response to the first user input and also perform the second function in response to the second user input.

Figure 5:
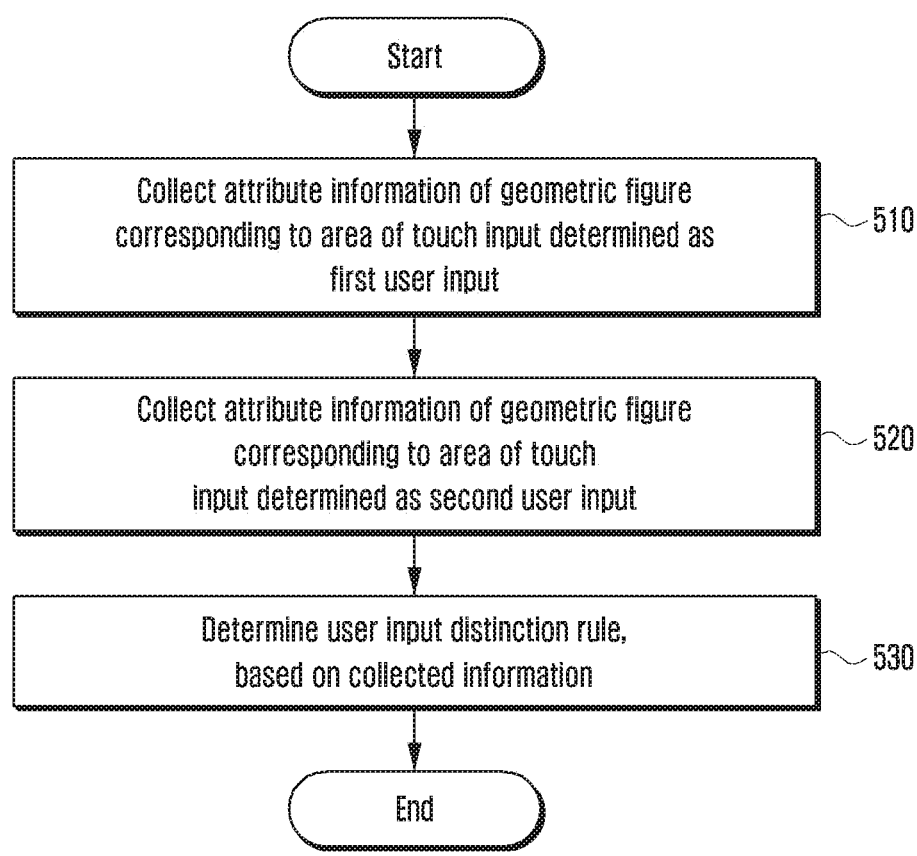
FIG. 5 is a flow diagram illustrating a method for determining a user input distinction rule of an electronic device according to an embodiment of the present disclosure.

FIG. 5 is a flow diagram illustrating a method for determining a user input distinction rule of an electronic device according to an embodiment of the present disclosure. For example, the method shown in FIG. 5 may be performed by the processor 130 of FIG. 1.

The processor may collect touch inputs provided by the user at a usual time and then determine a user input distinction rule from a pattern of the collected touch inputs. Also, the processor may enter a mode for learning the user input distinction in response to a user command and then determine the user input distinction rule. According to various embodiments of this disclosure, the processor may determine the user input distinction rule, based on attribute information collected at operation 510 and/or operation 520.

At operation 510, the processor may collect the attribute information of a geometric figure corresponding to the area of a touch input determined as the first user input. For example, the processor may collect the attribute information corresponding to a normal touch input from a user's use at a usual time. Then, at operation 530, the processor may estimate the user input distinction rule for distinguishing the touch input, based on the attribute information.

Alternatively or additionally, the processor may receive the normal touch inputs in the learning mode and collect the attribute information of the geometric figure corresponding to the first user input.

At operation 520, the processor may collect the attribute information of a geometric figure corresponding to the area of a touch input determined as the second user input. For example, the processor may receive touch inputs classified in the learning mode and collect the attribute information of the geometric figure corresponding to the second user input.

At operation 530, the processor may determine the user input distinction rule, based on the collected attribute information. For example, the processor may determine the user input distinction rule, based on the attribute information of the geometric figure corresponding to the first and second user inputs collected in the learning mode.

The attribute information of the geometric figure may include at least one of a length, an area, the number of pixels, a shape, a direction, and a slope of the entire or part of the geometric figure or a secondary figure derived from the geometric figure. The processor may determine the user input distinction rule by using a value having the lowest distinction error in the attribute information. Also, the processor may determine the user input distinction rule by weighting a specific touch input among touch inputs.

Figure 6:
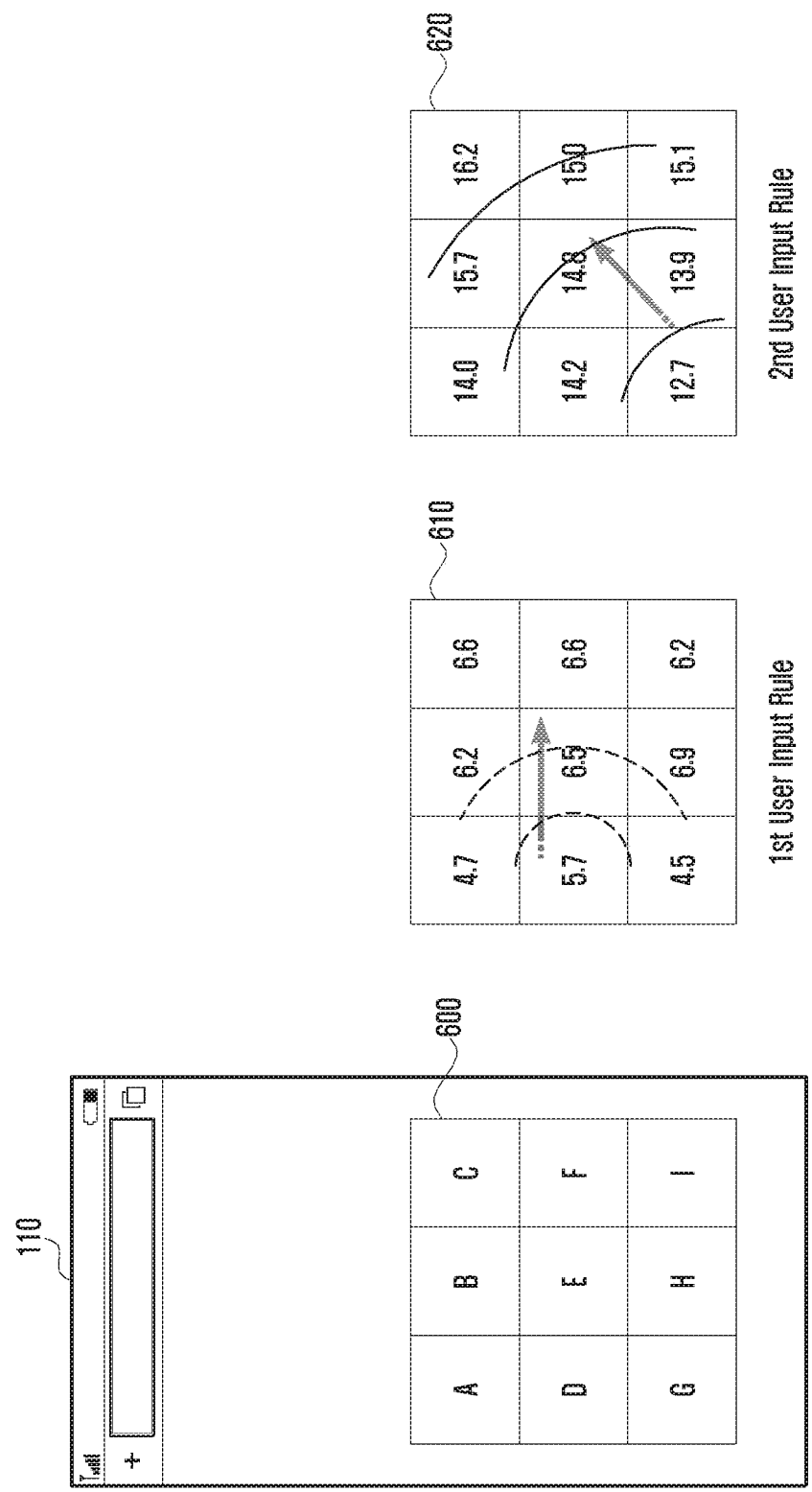
FIG. 6 is a diagram illustrating an example of determining a user input distinction rule based on positions on a touch screen according to an embodiment of the present disclosure.

FIG. 6 is a diagram illustrating an example of determining a user input distinction rule based on positions on a touch screen according to an embodiment of the present disclosure.

Also, referring to FIG. 6, the processor may divide a screen of the touch screen unit 110 into predetermined regions 600 and apply the user input distinction rule differently to the divided regions. Namely, the processor may derive a difference of a figure attribute corresponding to the area of a touch input for each of the divided regions and may determine the user input distinction rule for each divided region by using the attribute information having the lowest distinction error. For example, the processor may set the threshold related to the first user input for each divided region as indicated by a reference numeral 610 and also set the threshold related to the second user input for each divided region as indicated by a reference numeral 620.

For improving reliability, the processor may collect the figure attribute information for a given time and then determine the input distinction according to the rule. Alternatively, for a rapid response time, the processor may determine the input distinction as soon as a value of maximum, minimum, average, deviation, variation, or distribution of all or some attributes of a geometric figure or a derived secondary figure satisfies the rule. For example, the processor may define the decision timing of a touch input as a case when the average of attribute information of the figure satisfies the user input distinction rule value or when the attribute information of the figure exceeds the user input distinction rule value.

Figure 7A:
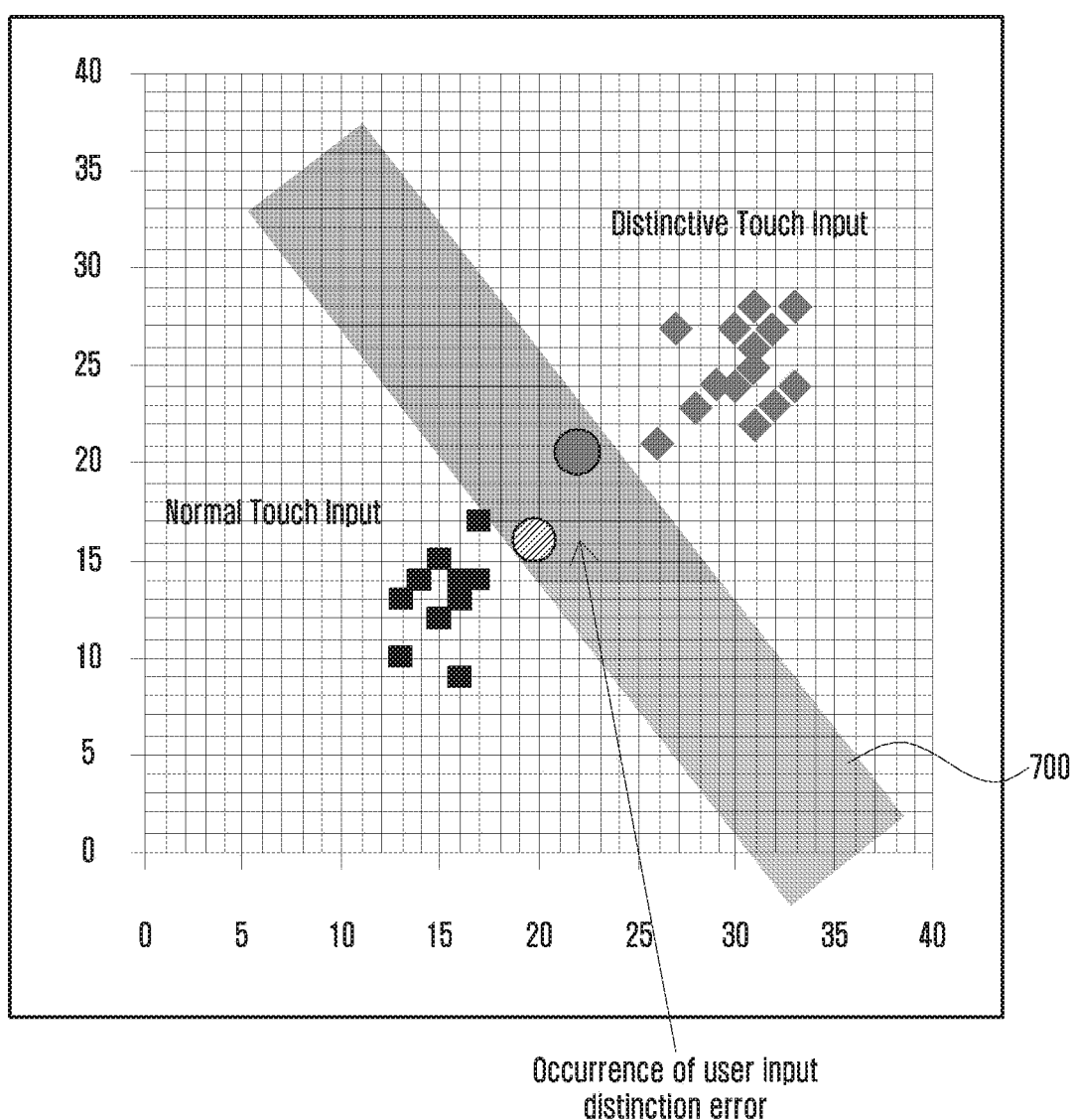
FIG. 7A is a diagram illustrating an error in user input distinction according to an embodiment of the present disclosure.

FIG. 7A is a diagram illustrating an error in user input distinction according to an embodiment of the present disclosure.

For example, referring to FIG. 7A, a touch input may be defined as a first user input (e.g., a normal touch input) or a second user input (e.g., a distinctive touch input), based on major/minor axis length of a geometric figure corresponding to the area of the touch input. However, if a touch input having a value of an ambiguously distinctive region 700 is detected, an error may occur in the distinction of the touch input, or the probability of error occurrence may be a predetermined value or more.

In this case, the electronic device may perform the additional input distinction procedure described at operation 440 of FIG. 4 or may adjust the user input distinction rule.

Figure 7B:
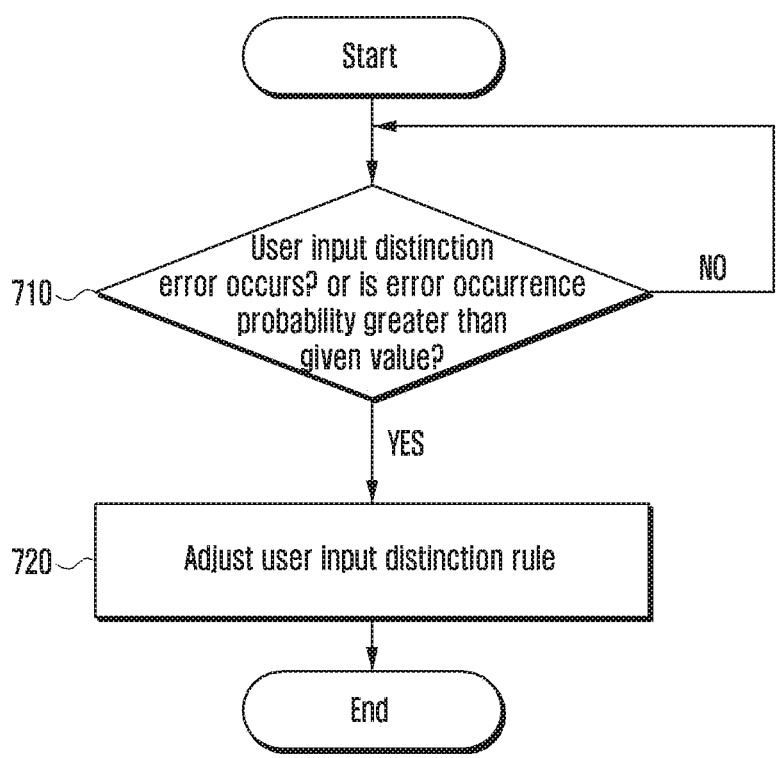
FIG. 7B is a flow diagram illustrating a method for adjusting a user input distinction rule of an electronic device according to an embodiment of the present disclosure.

FIG. 7B is a flow diagram illustrating a method for adjusting a user input distinction rule of an electronic device according to an embodiment of the present disclosure. For example, the method shown in FIG. 7B may be performed by the processor 130 of FIG. 1.

At operation 710, the processor may determine whether a user input distinction error occurs or whether an error occurrence probability is greater than a given value. This is explained as performing error checking. For example, the processor may perform the above-discussed additional input distinction procedure if it is determined that an error occurs or an error occurrence probability is greater than a given value. In addition, the processor may determine whether an error caused by a touch input having a value in a certain range occurs more than a threshold in the ambiguously distinctive region 700.

At operation 720, the processor may adjust the user input distinction rule. For example, the processor may increase or decrease the threshold of the user input distinction rule toward a predetermined range so as to reduce the error probability.

FIG. 8 is a diagram illustrating an example of executing various functions in response to a distinctive touch input of an electronic device according to an embodiment of the present disclosure.

For example, the method shown in FIG. 8 may be performed by the processor 130 of FIG. 1. The distinctive touch input refers to a touch input distinguished from a normal touch input. For example, as describe earlier, the second user input different from the first user input or a wide touch input distinguished from a narrow touch input may be referred to as the distinctive touch input.

If any detected touch input is determined as the distinctive touch input 810, the processor may perform the corresponding function.

As an example, in response to the distinctive touch input, the processor may perform a common control 820 regardless of a currently executed function, page, APP, or a selected object. For example, the processor may provide a common control UI 830. The common control UI may include, for example, a UI for common function control regardless of the currently executed function, page, APP, or the selected object. For example, depending on an associated operation, the processor may invoke a pointer so as to select and execute an object in a non-reachable region or may define a frequently used function as a shortcut key.

As another example, in response to the distinctive touch input, the processor may perform a touch object-specific control 840. For example, the processor may execute a function 850 corresponding to an object associated with the touch input. In case of an app icon object, the normal touch input may be used for performing an app trigger, but the distinctive touch input may be used as an input for changing an app's settings. Such an additional input applied to the object may be changed as needed.

As still another example, in response to the distinctive touch input, the processor may perform a user-specific control 860. The processor may create statistics of various kinds of information, obtained through a user's touch input, such as maximum and minimum values, an average value, a deviation value, and calculation results thereof with regard to major and minor axes of a geometric figure corresponding to the area of each of a normal touch input and a distinctive touch input. Such statistical information indicates the number of users of the device and the characteristics of users. Therefore, based on the statistical information, the processor may provide different UIs 870 for respective users or provide user-customized services (e.g., recommendation for changing the size of an app icon). Also, when any input of unusual pattern is detected, the processor may execute a user-specific security function to require additional authentication. For example, the processor may provide a common function to the users in case of the normal touch input, and may provide user-customized UIs to the users in case of the distinctive touch input. The user-customized UI may be determined by considering the frequency of use of an APP by each user, or may be determined by user-specific setting. Also, the processor may provide a common function to the users in case of the normal touch input, and may execute a security function for each user upon successful authentication by requesting user-specific authentication in case of the distinctive touch input.

At least part of the device (e.g., modules or functions thereof) or method (e.g., operations) according to various embodiments may be implemented as commands stored, e.g., in the form of program module, in a computer-readable storage medium. In case commands are executed by a processor, the processor may perform a particular function corresponding to that commands. The computer-readable storage medium may be, for example, the storage unit 120. According to various embodiments, at least a part of the programming module may be implemented in software, firmware, hardware, or a combination of two or more thereof. At least some of the program module may be implemented (e.g., executed) by, for example, the processor. At least some of the program module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a compact disc-read only memory (CD-ROM) and a DVD, magneto-optical media such as a floptical disk, and hardware devices specially configured to store and perform a program instruction. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or programming module according to various embodiments may include or exclude at least one of the above-discussed components or further include any other component. The operations performed by the module, programming module or any other component according to various embodiments may be executed sequentially, in parallel, repeatedly, or by a heuristic method. Additionally, some operations may be executed in different orders or omitted, or any other operation may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of processing an input in an electronic device having a touch screen, the method comprising:
    determining a user input distinction rule, the user input distinction rule comprising a first threshold value associated with a normal touch input and a second threshold value associated with a distinctive touch input;
    identifying attribute information of a geometric figure corresponding to an area of a touch input detected through the touch screen;
    determining, based on the identified attribute information of the geometric figure corresponding to the area of the touch input, a user input, the attribute information correlating to a stored user input distinction rule and a location of the touch input;
    executing a first function, in case that the user input is determined to be the normal touch input based on a value of the attribute information being closer to the first threshold value than the second threshold value;
    executing a second function, in case that the user input is determined to be the distinctive touch input based on the value of the attribute information being closer to the second threshold value than the first threshold value;
    when the value of the attribute information of the touch input is detected as a value between the first threshold value and the second threshold value, determining that an error occurrence probability exceeds a predetermined value; and
    according to determining that the error occurrence probability exceeds the predetermined value, increasing the first threshold value and decreasing the second threshold value or decreasing the first threshold value and increasing the second threshold value.

2. The method of claim 1, wherein the attribute information of the geometric figure comprises at least one of a maximum, a minimum, an average, a deviation or a distribution value for at least one of a length, an area, a number of pixels, a shape, a direction or a slope in connection with all or part of the geometric figure or a secondary figure derived from the geometric figure.

3. The method of claim 1, wherein the determining of the user input distinction rule comprises:
    collecting at least one of the attribute information of the geometric figure corresponding to the area of the touch input determined as a first user input or the attribute information of the geometric figure corresponding to the area of the touch input determined as a second user input; and
    determining the user input distinction rule, based on the at least one of the collected attribute information.

4. The method of claim 3, wherein the determining of the user input distinction rule, based on the at least one of the collected attribute information, comprises:
    determining the user input distinction rule, based on at least one value having a lower distinction error among a maximum, a minimum, an average, a deviation and a distribution value for at least one of a length, an area, a number of pixels, a shape, a direction or a slope in connection with all or part of the geometric figure.

5. The method of claim 3, wherein the determining of the user input distinction rule, based on the at least one of the collected attribute information, comprises:
    determining the user input distinction rule by weighting a specific touch input between the first and second user inputs.

6. The method of claim 3, wherein the determining of the user input distinction rule, based on the at least one of the collected attribute information, comprises:
    determining the user input distinction rule differently according to positions on the touch screen.

7. The method of claim 1, wherein, when the user input distinction error occurs or the error occurrence probability exceeds the predetermined value, the method further comprising at least one of:

determining the user input, based on a predetermined priority;

determining the user input by providing a menu for distinguishing the user input and detecting an input for the menu;

outputting a guide for the touch input; or determining the user input by detecting an additional input distinction operation.

8. The method of claim 1, further comprising at least one of:

providing a user interface (UI) corresponding to the determined user input;

executing a function corresponding to a graphical object associated with the touch input, based on the determined user input; or performing at least one of providing a user-specific UI corresponding to the determined user input or executing a user-specific security function, based on data collected according to each user.

9. The method of claim 1, wherein the user input of the normal touch input and the distinctive touch input is input by a same input device.

10. An electronic device comprising:

a touch screen configured to detect a touch input;

a memory configured to store a user input distinction rule; and at least one processor configured to:

determine a user input distinction rule, wherein the user input distinction rule comprises a first threshold value associated with a normal touch input and a second threshold value associated with a distinctive touch input, identify attribute information of a geometric figure corresponding to an area of the touch input detected through the touch screen, determine, based on the identified attribute information of the geometric figure corresponding to the area of the touch input, a user input, the attribute information correlating to the stored user input distinction rule and a location of the touch input, execute a first function, in case that the user input is determined to be the normal touch input based on a value of the attribute information being closer to the first threshold value than the second threshold value, execute a second function, in case that the user input is determined to be the distinctive touch input based on the value of the attribute information being closer to the second threshold value than the first threshold value, when the value of the attribute information of the touch input is detected as a value between the first threshold value and the second threshold value, determine that an error occurrence probability exceeds a predetermined value, and according to determining that the error occurrence probability exceeds the predetermined value, increase the first threshold value and decrease the second threshold value or decrease the first threshold value and increase the second threshold value.

11. The electronic device of claim 10, wherein the attribute information of the geometric figure comprises at least one of a maximum, a minimum, an average, a deviation or a distribution value for at least one of a length, an area, a number of pixels, a shape, a direction or a slope in connection with all or part of the geometric figure or a secondary figure derived from the geometric figure.

12. The electronic device of claim 10, wherein the at least one processor is further configured to:

collect at least one of the attribute information of the geometric figure corresponding to the area of the touch input determined as a first user input or attribute information of the geometric figure corresponding to the area of the touch input determined as a second user input, and determine the user input distinction rule, based on the at least one of the collected attribute information.

13. The electronic device of claim 12, wherein the at least one processor is further configured to determine the user input distinction rule, based on at least one value having a lower distinction error among a maximum, a minimum, an average, a deviation and a distribution value for at least one of a length, an area, a number of pixels, a shape, a direction or a slope in connection with all or part of the geometric figure.

14. The electronic device of claim 12, wherein the at least one processor is further configured to determine the user input distinction rule by weighting a specific touch input between the first and second user inputs.

15. The electronic device of claim 12, wherein the at least one processor is further configured to determine the user input distinction rule differently according to positions on the touch screen.

16. The electronic device of claim 10, wherein, if when the user input distinction error occurs or the error occurrence probability exceeds the predetermined value, the at least one processor is further configured to:

determine the user input, based on a predetermined priority, determine the user input by providing a menu for distinguishing the user input and detecting an input for the menu, output a guide for the touch input, or determine the user input by detecting an additional input distinction operation.

17. The electronic device of claim 10, wherein the at least one processor is further configured to:

provide a user interface (UI) corresponding to the determined user input, execute a function corresponding to a graphical object associated with the touch input, based on the determined user input, or perform at least one of providing a user-specific UI corresponding to the determined user input or executing a user-specific security function, based on data collected according to each user.

18. The electronic device of claim 10, wherein the user input of the normal touch input and the distinctive touch input is input by a same input device.

19. The electronic device of claim 10, wherein, when the attribute information of the geometric figure in connection with the touch input belongs to an ambiguous region that is not distinguished by the user input distinction rule, the user input distinction error occurs.

* * * * *